(12) United States Patent
Winkelmann

(10) Patent No.: US 12,073,380 B2
(45) Date of Patent: Aug. 27, 2024

(54) METHOD AND SYSTEM FOR ACTIVATING A PORTABLE CONTACTLESS-PAYMENT OBJECT

(71) Applicant: Swatch AG, Bienne (CH)

(72) Inventor: Christoph Winkelmann, Aarberg (CH)

(73) Assignee: Swatch AG, Bienne (CH)

( * ) Notice: Subject to any disclaimer, the term of this patent is extended or adjusted under 35 U.S.C. 154(b) by 1104 days.

(21) Appl. No.: 16/595,703

(22) Filed: Oct. 8, 2019

(65) Prior Publication Data

US 2020/0126063 A1   Apr. 23, 2020

(30) Foreign Application Priority Data

Oct. 17, 2018   (EP) ..................................... 18201011

(51) Int. Cl.
*G06Q 40/00* (2023.01)
*G06Q 20/20* (2012.01)
*G06Q 20/32* (2012.01)
*G06Q 20/34* (2012.01)
*G06Q 20/40* (2012.01)

(52) U.S. Cl.
CPC ......... *G06Q 20/3278* (2013.01); *G06Q 20/20* (2013.01); *G06Q 20/322* (2013.01); *G06Q 20/341* (2013.01); *G06Q 20/352* (2013.01); *G06Q 20/40* (2013.01)

(58) Field of Classification Search
None
See application file for complete search history.

(56) References Cited

U.S. PATENT DOCUMENTS

| | | | |
|---|---|---|---|
| 6,678,535 B1 | 1/2004 | Narayanaswami | |
| 9,942,222 B1 | 4/2018 | Fenton et al. | |
| 2004/0236819 A1 | 11/2004 | Anati et al. | |
| 2012/0173431 A1* | 7/2012 | Ritchie | G06Q 20/367 705/65 |
| 2014/0244505 A1 | 8/2014 | Kim | |

(Continued)

FOREIGN PATENT DOCUMENTS

| CN | 106332143 A | 1/2017 |
|---|---|---|
| CN | 106485486 A | 3/2017 |

(Continued)

OTHER PUBLICATIONS

Korean Office Action issued on Feb. 24, 2021 in Korean Patent Application No. 10-2019-0128624 (with English Translation), 16 pages.

(Continued)

*Primary Examiner* — Chia-Yi Liu

(74) *Attorney, Agent, or Firm* — Oblon, McClelland, Maier & Neustadt, L.L.P.

(57) ABSTRACT

A method for activating a portable contactless payment object of the timepiece or piece of jewellery type able to participate in the making of an electronic payment by tokenisation, the method including the following steps: obtaining of a payment token by an electronic device, in particular mobile, coming from a server of a trusted third party providing a payment service by tokens, and configuration of the portable object with a view to use thereof providing a transmission of the token included in the electronic device to the portable object with an activation terminal.

13 Claims, 1 Drawing Sheet

(56) References Cited

U.S. PATENT DOCUMENTS

Figure 1:
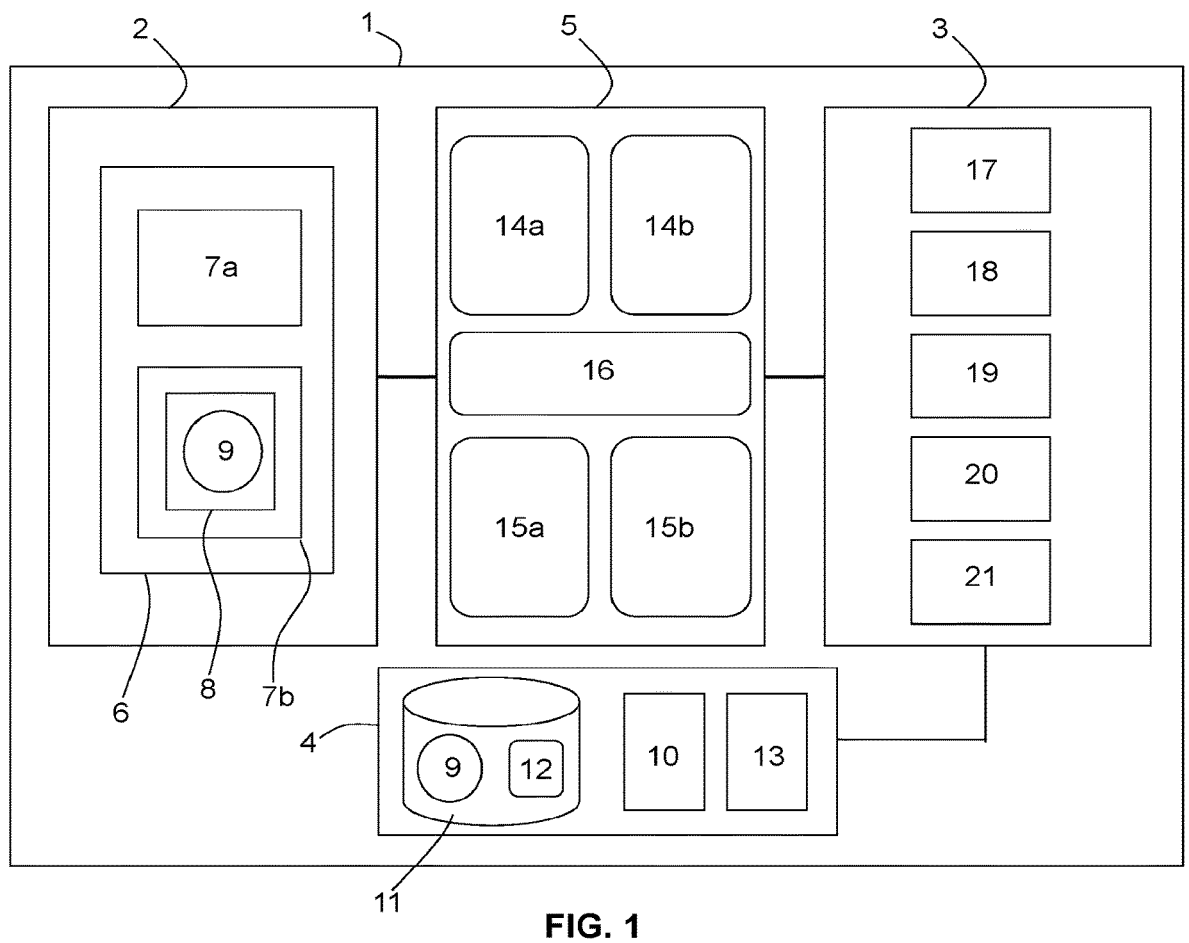

| | | |
|---|---|---|
| 2014/0279479 A1 | 9/2014 | Maniar et al. |
| 2015/0120568 A1 | 4/2015 | Hagemann et al. |
| 2015/0339663 A1 | 11/2015 | Lopreiato et al. |
| 2016/0012465 A1* | 1/2016 | Sharp ............... G06Q 20/321 705/14.17 |
| 2016/0247144 A1* | 8/2016 | Oh .................. G06K 7/083 |
| 2016/0286342 A1 | 9/2016 | Maddocks et al. |
| 2016/0314456 A1 | 10/2016 | Douglas et al. |
| 2017/0119276 A1* | 5/2017 | Lee ................ A61B 5/112 |
| 2017/0142600 A1 | 5/2017 | Dieckmann et al. |
| 2017/0161720 A1 | 6/2017 | Xing et al. |
| 2017/0168120 A1 | 6/2017 | Gach et al. |
| 2017/0359736 A9 | 12/2017 | Dieckmann et al. |
| 2018/0137499 A1 | 5/2018 | Douglas et al. |
| 2018/0144337 A1 | 5/2018 | Maniar et al. |
| 2018/0288030 A1 | 10/2018 | Witrisna et al. |

FOREIGN PATENT DOCUMENTS

| | | |
|---|---|---|
| CN | 108604728 A | 9/2018 |
| EP | 3 062 271 A1 | 8/2016 |
| JP | 2017-519290 A | 7/2017 |
| JP | 2018-520526 A | 7/2018 |
| KR | 10-2014-0109108 A | 9/2014 |
| KR | 10-2015-0093781 A | 8/2015 |
| KR | 10-2018-0010028 A | 1/2018 |
| WO | WO 2016/102408 A1 | 6/2016 |
| WO | WO 2016/172432 A1 | 10/2016 |
| WO | WO 2017/039241 A1 | 3/2017 |
| WO | WO 2018/163289 A1 | 9/2018 |

OTHER PUBLICATIONS

Japanese Office Action issued January S. 2021 in Japanese Patent Application No. 2019-189142 (with English translation), 8 pages.

European Search Report issued Feb. 22, 2019 in European Application 18201011.6 filed on Oct. 17, 2018 (with English Translation of Categories of Cited Documents).

Leong, C, et al., "Near Field Communication and Bluetooth Bridge System for Mobile Commerce",2006 IEEE International Conference on Industrial Informatics, 2016, 6 pages.

Krishna, S, et al., "A Wearable Wireless RFID System for Accessible Shopping Environments", Proceedings of the $3^{rd}$ International ICST Conference on Body Area Networks, 2008, 8 pages.

Combined Chinese Office Action and Search Report issued Feb. 28, 2023 in Chinese Patent Application No. 201910982487.0 (with English Translation of Office Action only), 13 pages.

Notice of Reasons for Refusal, issued Aug. 1, 2023, in Japanese Application No. 2022-105410 filed Jun. 30, 2022, (9 pages).

* cited by examiner

METHOD AND SYSTEM FOR ACTIVATING A PORTABLE CONTACTLESS-PAYMENT OBJECT

CROSS-REFERENCE TO RELATED APPLICATION

This application claims priority to European Patent Application No. 18201011.6 filed on Oct. 17, 2018, the entire disclosure of which is hereby incorporated herein by reference.

FIELD OF THE INVENTION

The invention relates to a method for activating a portable contactless-payment object of the timepiece or item of jewellery type able to participate in the making of an electronic payment by tokenisation and to a system implementing such a method.

The invention also relates to the portable object and to an activation terminal that are able to be used in this system.

The invention also relates to a computer program comprising program code instructions for executing steps of this method.

BACKGROUND OF THE INVENTION

With the increasing development of the digital economy, the proportion of payment transactions by bank card has greatly increased during the past years. In this context, appreciable improvements to the protection of these bank cards have been achieved but bank-card frauds still remain in existence.

In order to overcome this drawback, novel payment methods have then appeared by proposing in particular a payment process by "tokenisation". In this novel process, the banking data of a potential purchaser are then replaced by discardable data referred to as a "token", which are stored in a mobile payment application of a payment medium such as a computerphone. The purchaser thus has, in this computerphone, a token that he can use for a near-field payment by means of NFC (near field communication) technology.

However, one of the major drawbacks of this process lies in its implementation, which requires numerous lengthy and complex operations of activation of the payment medium.

SUMMARY OF THE INVENTION

The aim of the present invention is to overcome, wholly or partly, the aforementioned drawbacks by proposing activation of the payment medium that is simple and quick.

To this end, the invention relates to a method for activating a portable contactless-payment object of the timepiece or item of jewellery type able to participate in the making of an electronic payment by tokenisation, the method comprising the following steps:
  the obtaining of a payment token by an electronic device, in particular mobile, coming from a server of a trusted third party providing a payment service by tokens, and
  configuration of the portable object with a view to use thereof providing a transmission of said token included in the electronic device to said portable object by means of an activation terminal.
In other embodiments:
the obtaining step comprises a substep of digitisation by the electronic device of a first graphical representation included on an activation terminal, said first graphical representation comprising a matrix code;
the obtaining step comprises a substep of decoding the matrix code with a view to obtaining binary information sequences comprising data relating to a location of a digital file for configuring the electronic device;
the obtaining step comprises a substep of generation, by the electronic device configured by the digital file, of a request to obtain this payment token comprising data for producing said token comprising at least one banking data item;
the obtaining step comprises a substep of transmission of a payment token, by the server of the trusted third party, to the electronic device;
the step of configuration of the portable payment object comprises a substep of arrangement of this portable object on a data transmission zone defined on/in the activation terminal;
the step of configuration of the portable object comprises a substep of digitisation, by the electronic device, of a second graphical representation included on the activation terminal, said graphical representation comprising a matrix code, and
the step of configuring the portable object comprises a substep of decoding the matrix code with a view to obtaining binary information sequences comprising data relating to a configuration of a communication connection between this electronic device and the activation terminal.

The invention also relates to a system for activating a portable contactless-payment object of the timepiece or item of jewellery type able to participate in the making of an electronic payment by tokenisation, the system comprising the following elements able to communicate with each other: an electronic device, in particular mobile, a server of a trusted third party providing a payment service by tokens and an activation terminal.

Advantageously, the activation terminal comprises first and second graphical representations each comprising a matrix code.

In particular, the activation terminal comprises a data transmission zone.

The invention also relates to a portable contactless-payment object of the timepiece or item of jewellery type able to be used in such a system.

The invention also relates to an activation terminal able to be used in such a system.

The invention also relates to a computer program comprising program code instructions for executing steps of this method, when said computer program is executed by the processing module of the server, the processing unit of the electronic device and the contactless proximity communication module of the portable object.

SUMMARY DESCRIPTION OF THE DRAWINGS

Figure 2:
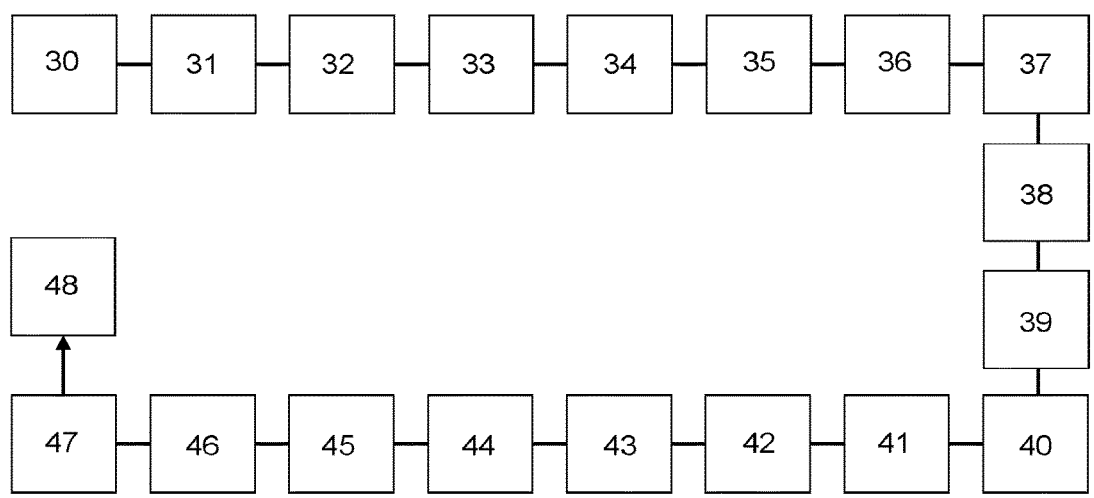

Other particularities and advantages will emerge clearly from the description that is given thereof below, by way of indication and in no way limitatively, with reference to the accompanying figures, in which:

FIG. 1 is a schematic representation of a system for activating a portable contactless-payment object of the timepiece or jewellery type able to participate in the making of an electronic payment by tokenisation, according to the embodiment of the invention, and FIG. 2 is a logic diagram relating to a method for activating the portable contactless-payment object able to participate in the making of an electronic payment by tokenisation, according to the embodiment of the invention.

DETAILED DESCRIPTION OF PREFERRED EMBODIMENTS

FIG. 1 depicts a system 1 for activating a portable contactless-payment object 2. Such a system 1 makes it possible to configure the portable object 2 so that it participates in the making of an electronic payment by tokenisation during a transaction performed between a merchant/shopkeeper and the bearer of this portable object 2.

Electronic payment by tokenisation falls within the field of electronic banking. In such a field, this tokenisation is the process of replacing payment data such as banking data 12 (card number, etc.) with discardable data referred to as "token 9". This token 9 is also referred to as the "DAN" (standing for digital account number). In other words, this process makes it possible to replace a critical data item with an equivalent element, here the "token 9", where said token 9 will have no intrinsic value or exploitable signification once it has left the payment system. It will therefore be understood that tokenisation is the method for replacing a critical data item with an equivalent element that will have no intrinsic value or exploitable signification once it has left the payment system.

Such a system 1 then comprises:
- the portable contactless-payment object 2;
- an electronic device 3;
- a server of a trusted third party 4 providing a payment service by tokens 9;
- an activation terminal 5.

In this system 1, the portable contactless-payment object 2 is preferably a timepiece or an item of jewellery. Such an object 2 comprises a contactless proximity communication module 6 performing security functions and very short distance communications of the "near-field communication" type. This module may be an NFC (standing for "near field communication") proximity communication module 6. This module 6 comprises a near-field communication antenna 7a and a microcircuit 7b connected to the antenna. The microcircuit 7b and the antenna 7a form together near-field communication means able to communicate with an external item of equipment such as a contactless payment terminal or the activation terminal 5. The microcircuit 7b comprises hardware and software resources, in particular at least one processor cooperating with memory elements 8. In this portable object 2, the antenna 7a is formed for example by a plurality of electrically-conductive turns and delimits a useful surface for receiving a magnetic field.

In this portable object 2, the memory elements 8 are able to archive at least one payment token 9. This token 9 comprises, non-exhaustively and non-limitatively:
- a token identifier such as a token number;
- a date of expiry of the token or period of validity of the token;
- a geographical zone for use of the token;
- a transaction ceiling;
- a cryptogram, which may be a password, a personal code or a digital biometric print.

As we shall see hereinafter, each token 9 is generated by the server of a trusted third party 4 providing a payment service by token. This trusted third party, otherwise referred to as a token service provider, manages the process of delivering and generating this token 9. This server 4 comprises a processing module 10 provided with hardware and software resources, in particular at least one processor cooperating with memory elements as well as a database 11 comprising in particular generated tokens 9 which are each associated with banking data 12 of the bearer. Such banking data 12 comprise, non-limitatively and non-exhaustively:
- a number of the bank card of the bearer;
- an expiry date of the card;
- personal data of the bearer: surname, first name, address, etc.;
- a bank account number;
- etc.

The server 4 also comprises a communication unit 13 for receiving and sending data at a distance via the cellular telephone network, a data network of the IP type via the telephone network or a data network of the IP type via a cabled network of the Ethernet type.

As seen previously, the activation terminal 5 of this system 1 participates in the configuration of the portable object 2. This activation terminal 5 is a box preferably having an essentially parallelepipedal shape. Such an activation terminal 5 comprises first and second graphical representations 14a, 14b each comprising a matrix code. This matrix code may be a bar code in two or three dimensions. This matrix code may for example comprise a QR code or a datamatrix code. This matrix code comprises sequences of binary information that are encoded/encrypted. In the first graphical representation 14a, the matrix code comprises sequences of binary information comprising data relating to a location of a digital file for configuring the electronic device 3. With regard to the second graphical representation, the matrix code comprises sequences of binary information comprising data relating to a configuration of a communication link, in particular wireless, between this electronic device 3 and the activation terminal 5.

Such first and second graphical representations 14a, 14b are defined on a visible external face of this activation terminal 5. It will be understood that this visible external face is designed so that the electronic device 3 can be arranged opposite this external face so as to be in a position to capture these first and second graphical representations 14a, 14b, as we shall see hereinafter. The activation terminal 5 also comprises a data transmission zone 16 in which the portable object 2 is able to be arranged or which is able to receive/support this said portable object 2.

Such an activation terminal 5 comprises two communication modules, first and second communication modules 15a, 15b. This first communication module 15a comprises a contactless proximity communication unit performing certain security functions and making very short distance communications of the "near-field communication" type. This unit is able to exchange data bidirectionally with the communication module 6 of the portable object 2. This unit is an NFC (standing for "near field communication") proximity communication unit. To do this, this unit comprises a near-field communication antenna and a microcircuit connected to the antenna. The microcircuit comprises hardware and software resources, in particular at least one processor cooperating with memory elements. In this portable object 2, the antenna is formed for example by a plurality of electrically conductive turns and delimits a useful surface receiving a magnetic field.

The second communication module 15b comprises a communication unit for receiving and sending data at a distance via a wireless network of the Wi-Fi or Bluetooth type. This second module is able to exchange data bidirectionally with the electronic device 3.

In addition, it should be noted that the activation terminal 5 is connected to an external electrical supply source and comprises an electrical accumulator.

The electronic device 3 is for example a computer, a computerphone, a smartphone, a tablet or an electronic terminal. Such an electronic device 3 is preferably mobile and/or portable and/or compact. This electronic device 3 comprises, non-limitatively and/or non-exhaustively:

- a processing unit 21 comprising hardware and software resources, in particular at least one processor cooperating with memory elements;
- a display module 17 of the screen type;
- an interface for broadcasting audible information, such as a loudspeaker;
- a communication interface 18 enabling the electronic device 3 to establish a communication connection with the activation terminal 5 and/or with the server of the trusted third party 4 for carrying out a data exchange;
- a selection interface 19 such as a keypad or touch interface included for example in the display module 17;
- a module 20 for capturing at least one image, comprising in particular an image sensor, otherwise referred to as a matrix image sensor, which may for example comprise CCD technology (charge transfer technology) sensors, or so-called CMOS technology sensors.

In this electronic device 3, the processing unit 21 is connected among other things to the display module 17, to the broadcasting interface, to the communication interface 18 and to the selection interface 19. The communication interface 18 of this electronic device 3 comprises communication elements for receiving and sending data at a distance via the cellular telephone network, a data network of the IP type via the telephone network or a data network of the IP type via a medium-range network, for example Wi-Fi, or short-range network based on Bluetooth technology.

Each image sensor of the capture module 20 comprises a matrix of photosensitive image dots (or pixels). This matrix of dots is also referred to as a "matrix of pixels" and comprises N×M unit pixels with excellent sensitivity to light. The capture module 20 also comprises an analogue to digital converter AN connected to the processing unit 21 of the electronic device 3.

With reference to FIG. 2, this system 1 uses a method for activating the contactless-payment portable object 2 able to participate in the making of an electronic payment by tokenisation.

This method comprises a step 30 of the obtaining of the payment token 9 by an electronic device 3 coming from the trusted third-party server 4 providing a payment service by tokens 9. The step 30 comprises a substep 31 of digitisation by the electronic device 3 of the first graphical representation 14a included on the activation terminal 5, said graphical representation 14a comprising a matrix code. This substep 31 provides a phase 32 of acquiring this first graphical representation 14a as soon as the electronic device 3 is arranged in the immediate vicinity of the activation terminal 5 so that the capture module 20 is disposed opposite this first graphical representation 14a. During this phase 32, the matrix of pixels detects at least one image coming from the first graphical representation 14a and then generates analogue signals relating to this image. The analogue to digital converter of the capture module 20 then converts these analogue signals coming from this matrix of pixels into digital signals that are next transmitted to the processing unit 21 of the electronic device 3.

Afterwards, this step 30 comprises a substep 33 of decoding the matrix code with a view to obtaining binary information sequences comprising data relating to a distant location of a digital file for configuring the electronic device 3. This substep 33 comprises a phase 34 of processing the digital signals relating to the graphical representation 14a acquired comprising the matrix code. During this phase 34, the processing unit 21 applies a decoding algorithm to said digital signals so as to obtain the binary information signals comprising data relating to a location of a digital file for configuring the electronic device 3. These binary information sequences preferably comprise a hypertext link.

Next, the obtaining step 30 comprises a substep 35 of generation, by the electronic device 3 configured by the digital file, of a request to obtain this payment token 9 comprising data for producing said token 9 comprising at least one banking data item 12. As seen previously, a banking data item 12 comprises in particular characteristics of a bank account and/or of a medium for a payment method of the bearer of the portable object 2. Such production data comprise, non-limitatively and non-exhaustively:

- the number of the bank card of the bearer,
- the expiry date of the card.

Alternatively, these production data may also comprise personal data of the bearer: surname, first name, address, etc., and/or the bank account number of the bearer.

This substep 35 comprises a phase 36 of configuration of the electronic device 3 during which the electronic file is executed by the processing unit 21 as soon as this digital file has been downloaded from a file server following the execution by the processing unit 21 of the binary information sequences comprising the hypertext link. This configuration phase 36 thus makes it possible to effect, by the execution of the digital file, installation of a computer program (or of a software application) that is next used by the processing unit 21 during a phase 37 of generating the request for obtaining this token 9. This generation phase 37 provides for the carrying out of a collection of at least one banking data item of the bearer of the portable object 2. The banking data item or items 12 are then recorded temporarily in the processing unit 21 from in particular selection 19 and display 17 interfaces of the electronic device 3, and this in expectation of the generation of the request to obtain. The processing unit 21 then generates the request to obtain this token 9 from said at least one banking data item collected. Afterwards this substep 35 comprises a phase 38 of transmitting the request to obtain comprising said at least one collected banking data item to the server of the trusted third party 4 providing a payment service by tokens. During this phase 38, said at least one banking data item collected included in the request may be encrypted and/or the request may be sent to this server 4 via a secure network. It should be noted that this request to obtain may be transmitted directly or indirectly to the server of the trusted third party 4. When this transmission is carried out indirectly, the request is then transmitted to this server 4 by means of a technical platform acting as a tokenisation service, otherwise referred to in English as a "token requestor", and which can then take care of conveying the request for a token 9.

This obtaining step 30 afterwards comprises a substep 39 of transmission of a payment token 9 by the server of the trusted third party 4 to the electronic device 3. This substep 39 comprises a phase 40 of generating the payment token 9 from said at least one banking data item received by this server 4. During this phase 40, the processing module 10 of the server 4 then generates the payment token 9 derived from said at least one banking data item. Such a phase 40 may provide for the use of tools for the random generation of this token 9 such as algorithms. In a variant, this token 9 may be generated from the banking data item or items 12 and a diversifier representing an authorisation for a payment transaction with use restriction criteria determined by the server 4, for example validity for one or more banking transactions, temporal validity, or validity for a transaction ceiling.

The method also comprises a step 41 of configuring the portable object 2 with a view to use thereof providing a transmission of said token 9 included in the electronic device 3 to said portable object 2 by means of the activation terminal 5. This step 41 comprises a substep 42 of arranging the portable object 2 on/in the data transmission zone 16 defined on/in the activation terminal 5. During this substep 42, the portable object 2 is arranged on/in this zone 16 so as to guarantee an optimum exchange of data between the contactless proximity communication module 6 of the portable object 2 and the first communication module 15a of the activation terminal 5.

Afterwards, the configuration step 41 comprises a substep 43 of digitisation, by the electronic device 3, of a second graphical representation 14b included on the activation terminal 5, said graphical representation 14b comprising a matrix code. This substep 43 provides a phase 44 of acquisition of this second graphical representation 14b as soon as the electronic device 3 is arranged in the immediate vicinity of the activation terminal 5 so that this capture module 20 is disposed opposite this second graphical representation. During this phase 44, the matrix of pixels detects at least one image coming from this second graphical representation 14b and then generates analogue signals relating to this image. The analogue to digital converter of the capture module 20 then next converts these analogue signals coming from this matrix of pixels into digital signals that are transmitted afterwards to the processing unit 21 of the electronic device 3.

Next the configuration step 41 comprises a substep 45 of decoding the matrix code with a view to obtaining binary information sequences comprising data relating to a configuration of a communication link between this electronic device and the activation terminal 5. This substep 45 comprises a phase 46 of processing the digital signals relating to the second graphical representation 14b acquired comprising the matrix code. During this phase 46, the processing unit 21 applies a decoding algorithm to said digital signals so as to obtain the binary information sequences comprising data relating to the configuration of a communication link between this electronic device 3 and the activation terminal 5.

Next, the obtaining step 41 comprises a substep 47 of establishing a communication link between the electronic device 3 and the activation terminal 5. During this substep 47, the processing unit 21 parameterises the communication interface 18 of this electronic device 3 for configuration of the communication link between the communication interface 18 and the second communication module 15b of the activation terminal 5.

Next, during a substep 48 of configuring the portable object 2 in preparation for its use for making a payment transaction, the processing unit 21 of the electronic device 3 transmits, to the second communication module 15b of the activation terminal 5 via its communication interface 18, the token 9 generated by the server of the trusted third party 4. This token 9 is next transmitted by the first communication module of the activation terminal 5 to the portable object 2 via the contactless proximity communication module 6 of this object 2.

Being thus activated, the portable object 2 can then participate in the making of the electronic payment by tokenisation during a transaction established between a merchant/shopkeeper and the bearer of this portable object 2.

The invention also relates to a computer program comprising program code instructions for executing steps of the method described above when said computer program is executed by the processing module 10 of the server 4, the processing unit 21 of the electronic device 3 and the contactless proximity communication module 6 of the portable object 2.

Naturally, the present invention is not limited to the example illustrated but is capable of various variants and modifications that will appear to a person skilled in the art.

The invention claimed is:

1. A method for activating a portable contactless payment object, being one of a timepiece or a piece of jewelry, so that the portable contactless payment object can make electronic payments by tokenisation, the method comprising:
    obtaining, by an electronic device in response to transmitting a request to obtain a payment token to a server of a trusted third party providing a payment service by tokens, the payment token being discardable data replacing banking data,
    activating the portable contactless payment object so that the portable contactless payment object can make the electronic payments, the activating including transmitting, by the electronic device, the payment token to the portable contactless payment object by first transmitting the payment token to an activation terminal having an image of a first graphical representative on a visible external face and communicatively coupled to the electronic device by a communication link, and then transmitting the payment token from the activation terminal to the portable contactless payment object so that the portable contactless payment object is activated, wherein the activating further comprises capturing, by the electronic device, the image included on the visible external face of the activation terminal, the first graphical representation comprising a first matrix code, and establishing the communication link between the electronic device and the activation terminal based on the first matrix code; and
    performing, by the portable contactless payment object, a purchase transaction via electronic payment using the received payment token, after the portable contactless payment object is activated in the activating step.

2. The method according to claim 1, wherein the obtaining further comprises digitizing, by the electronic device, a second graphical representation included on the visible external face of the activation terminal, the second graphical representation comprising a second matrix code.

3. The method according to claim 2, wherein the obtaining further comprises decoding the second matrix code to obtain binary information sequences comprising data relating to a location of a digital file for configuration of the electronic device.

4. The method according to claim 1, wherein the obtaining further comprises generating, by the electronic device configured by the digital file, the request to obtain the payment token, the request comprising data for production of the payment token including at least one banking data item.

5. The method according to claim 1, wherein the obtaining step further comprises transmitting the payment token by the server of the trusted third party to the electronic device.

6. The method according to claim 1, wherein the configuring the portable payment object further comprises physically arranging the contactless portable payment object on a data transmission zone defined on or in the activation terminal.

7. The method according to claim 1, wherein the activating further comprises decoding the first matrix code to obtain binary information sequences including data relating to a configuration of the communication link between the electronic device and the activation terminal.

8. A system for activation of a portable contactless payment object, being one of a timepiece or a piece of jewelry, so that the portable contactless payment object can make electronic payments by tokenization, the system comprising:
an electronic device,
the portable contactless payment object,
a server of a trusted third party providing a payment service by tokens, and
an activation terminal,
wherein the electronic device includes processing circuitry configured to
obtain, in response to transmitting a request to obtain a payment token to a server of a trusted third party providing a payment service by tokens, the payment token being discardable data replacing banking data, and
activate the portable contactless payment object so that the portable contactless payment object can make the electronic payments, the activating including transmitting the payment token to the portable contactless payment object by first transmitting the payment token to an activation terminal having an image of a first graphical representative on a visible external face and communicatively coupled to the electronic device by the communication link, and then transmitting the payment token from the activation terminal to the portable contactless payment object so that the portable contactless payment object is activated, wherein the processing circuitry, in activating the portable contactless payment object, is further configured to capture the image included on the visible external face of the activation terminal, the first graphical representation comprising a first matrix code, and establish the communication link between the electronic device and the activation terminal based on the first matrix code; and
wherein the portable contactless payment object is configured to perform a purchase transaction via electronic payment using the received payment token, after the portable contactless payment object is activated in the activating step.

9. The system according to claim 8, wherein the activation terminal comprises a second graphical representation on the visible external face, the second graphical representation including a second matrix code.

10. The system according to claim 8, wherein the activation terminal comprises a data transmission zone.

11. A non-transitory computer-readable medium storing a computer program, comprising program code instructions for the execution of the steps of the method according to claim 1, when said computer program is executed by processing circuitry of the electronic device.

12. The method according to claim 1, wherein the electronic device is a mobile device.

13. The system according to claim 8, wherein the electronic device is a mobile device.

* * * * *